US011784591B2

(12) United States Patent
Coupart et al.

(10) Patent No.: US 11,784,591 B2
(45) Date of Patent: Oct. 10, 2023

(54) DUAL MOTOR SYSTEM WITH FLOW CONTROL

(71) Applicant: Nidec Motor Corporation, St. Louis, MO (US)

(72) Inventors: Eric Coupart, Clayton, MO (US); James D. Ellis, II, Kirkwood, MO (US); Pranesh Rao, Chesterfield, MO (US); Bret S. Clark, Oakville, MO (US); John G. Schrader, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 489 days.

(21) Appl. No.: 17/078,223

(22) Filed: Oct. 23, 2020

(65) Prior Publication Data
US 2021/0123441 A1    Apr. 29, 2021

Related U.S. Application Data

(60) Provisional application No. 63/036,227, filed on Jun. 8, 2020, provisional application No. 62/925,128, filed on Oct. 23, 2019.

(51) Int. Cl.
*H02P 5/747* (2006.01)
*H02P 5/46* (2006.01)
(Continued)

(52) U.S. Cl.
CPC ............. *H02P 5/747* (2013.01); *E04H 4/12* (2013.01); *F04B 17/03* (2013.01); *H02K 17/02* (2013.01);
(Continued)

(58) Field of Classification Search
CPC . H02P 5/747; H02P 5/46; F04B 17/03; H02K 17/02; H02K 19/02; F04D 13/06;
(Continued)

(56) References Cited

U.S. PATENT DOCUMENTS 9,115,720 B2    8/2015  Rosinski et al.
9,541,089 B2    1/2017  Yamashita
(Continued)

FOREIGN PATENT DOCUMENTS

JP    2002079033 A  *  3/2002  ............ F24F 3/1423
WO    20181044717       6/2018

*Primary Examiner* — Bickey Dhakal
(74) *Attorney, Agent, or Firm* — Hovey Williams LLP

(57) ABSTRACT

A dual motor system includes a first motor providing a lower speed range and a second motor providing a higher speed range, wherein the motors are coaxially arranged and aligned on and drive a common shaft, and a motor control system controlling the speed of the first motor and engaging the second motor as needed. The first motor is a variable speed motor providing a lower two-thirds of a full speed range, and the second motor is an induction motor providing the upper one-third in the form of one or more discrete fixed speeds. The system may include a transformer including a first winding tap which provides a first higher speed, and a second winding tap which provides a second higher speed. The system may also include a flow control system for automatically controlling the speed of the motors for particular applications, such as flow control in a pool.

19 Claims, 8 Drawing Sheets

(51) Int. Cl.
    *F04B 17/03*       (2006.01)
    *H02K 17/02*       (2006.01)
    *H02K 19/02*       (2006.01)
    *E04H 4/12*        (2006.01)

(52) U.S. Cl.
    CPC ............... *H02K 19/02* (2013.01); *H02P 5/46* (2013.01); *H02K 2213/03* (2013.01)

(58) Field of Classification Search
    CPC .. F04D 25/0606; F04D 29/043; F04D 29/053; F04D 29/263; F04D 29/266
    See application file for complete search history.

(56) References Cited

U.S. PATENT DOCUMENTS

| | | |
|---|---|---|
| 9,562,534 B2 | 2/2017 | Rosinski et al. |
| 9,587,639 B2 | 3/2017 | Rosinski et al. |
| 9,932,984 B2 | 4/2018 | Stiles, Jr. et al. |
| 10,087,938 B2 | 10/2018 | Dahouk et al. |
| 10,399,828 B2 * | 9/2019 | Hiekata ................ H02K 1/2795 |
| 10,601,280 B2 | 3/2020 | Afshar |
| 11,073,155 B2 | 7/2021 | Stiles, Jr. et al. |
| 11,085,450 B2 | 8/2021 | Dahouk et al. |
| 2013/0007954 A1 * | 1/2013 | Sutton ................ F16K 31/52483 4/490 |
| 2013/0294928 A1 * | 11/2013 | Rosinski ............. F04D 29/4293 417/5 |
| 2014/0010671 A1 * | 1/2014 | Cryer .................... B60K 6/485 290/45 |
| 2016/0194942 A1 * | 7/2016 | Wiegman ................ F04B 17/03 166/250.15 |

* cited by examiner

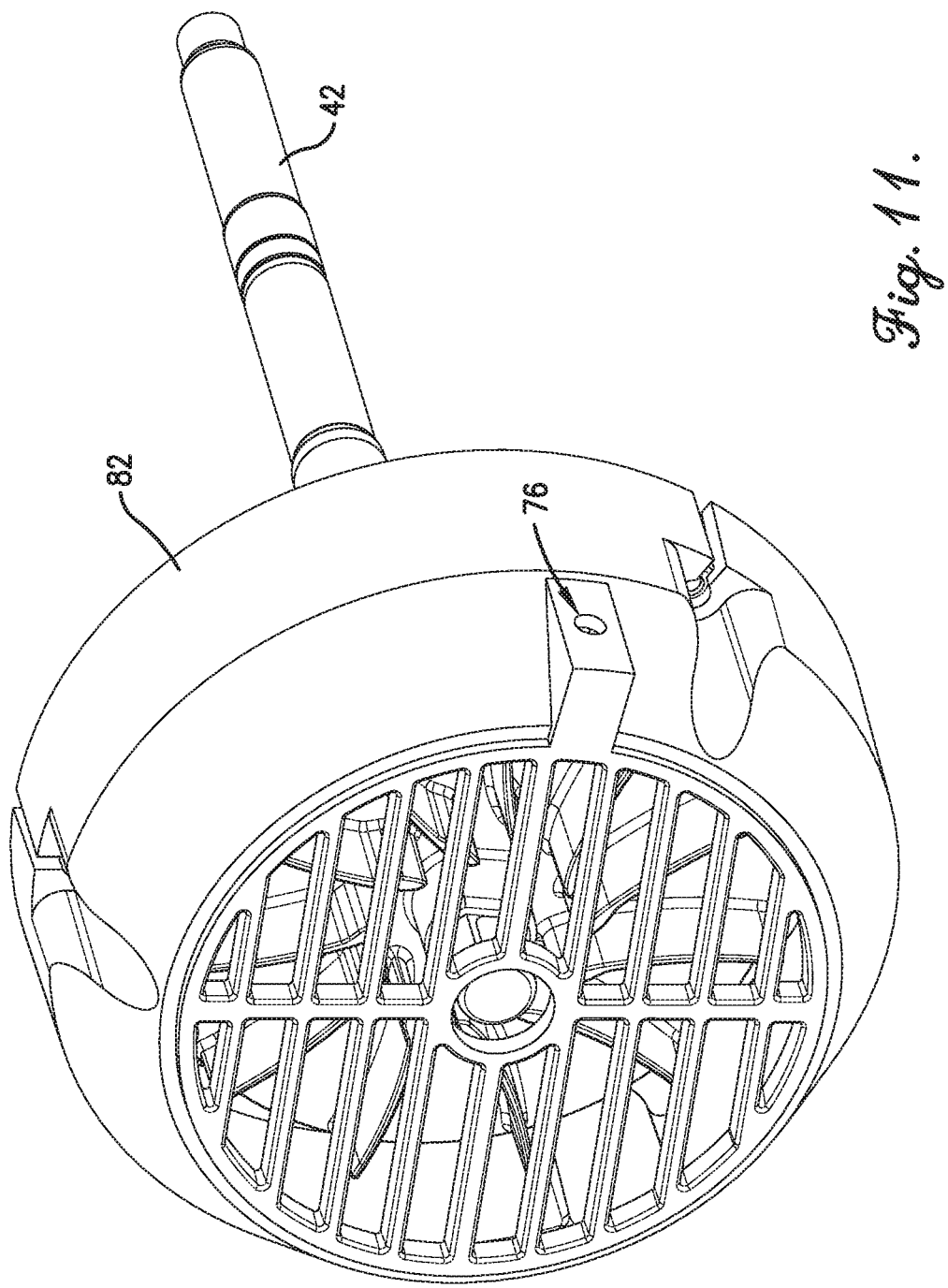

DUAL MOTOR SYSTEM WITH FLOW CONTROL

RELATED APPLICATIONS

The present U.S. non-provisional patent application is related to and claims priority benefit of a first prior-filed U.S. provisional patent application titled "Controlling Rotational Speed of a Motor," Ser. No. 62/925,128, filed Oct. 23, 2019, and a second prior-filed U.S. provisional patent application titled "Dual Motor System With Flow Control," Ser. No. 63/036,227, filed Jun. 8, 2020. The entire contents of the identified earlier-filed applications is incorporated by reference as though fully set forth herein.

FIELD

The present invention relates to electric motors and motor control systems. More particularly, an embodiment of the present invention concerns a dual motor system including first and second motors providing lower and higher speed ranges and being coaxially arranged and aligned on a common axis defined by a common shaft and configured to drive the common shaft. Another embodiment of the invention concerns a flow control system automatically, controlling the speed of the motors for particular applications, such as flow control in a pool.

BACKGROUND

In the past, pool pumps ran at one or two speeds, but it is desirable to be able to run at more speeds in order to improve efficiency and flexibility. For example, decreasing motor speed by one-half decreases power consumption by seventy to eighty percent, so being able to choose from among a plurality of different speeds allows for more closely controlling power consumption.

One solution has been to employ fully variable speed products. This involves supplying power to the motor via an electronic speed controller and controlling the speed of the motor between zero and one hundred percent of the highest speed by imposing the setpoint value at the input of the variable speed drive. This solution makes it possible to save energy by modifying the speed of the motor to comply as closely as possible with the optimum conditions of operation of the installation. For example, in the case of an air compressor, fine control of the speed of the motor driving the compressor makes it possible to avoid compressing the air in a buffer tank more than necessary. However, while variable speed control is less expensive for lower power motors it is too expensive for higher speed motors, so variable speed control can be used to provide greater control but at a higher cost to achieve the full speed load point.

Another solution is to employ multi-fixed speed induction motors using only motor windings of various resistances and no control. This involves regulating an average speed by switching the mains power supply on and off. The advantage of this approach is to avoid the electrical losses of the variable speed drive and to increase reliability. However, this control solution rules out operation under optimum conditions with regard to power consumption, and relatedly, while this is a lower cost solution it is unfeasible due to recent and pending regulations which require control.

For example, conventional pool pumps provide fully variable speed control to the highest load requirement. However, this is expensive because of the need for high horsepower motors and control electronics and the need to keep the electronics cool. Further, regulations may require a minimum number of pool pump speeds for energy conservation and/or safety, so despite the drawbacks, it has been necessary to employ fully variable speed control in order to be achieve the desired or required performance.

This background discussion is intended to provide information related to the present invention which is not necessarily prior art.

SUMMARY

Embodiments of the present invention address the above-described and other problems and limitations in the prior art by providing a dual motor system including a first motor providing a lower speed range and a second motor providing a higher speed range, wherein the motors are coaxially arranged and aligned on a common axis defined by a common shaft and are configured to drive the common shaft, and a motor control system controlling the speed of the first motor and engaging the second motor as desired or needed to drive the common shaft. Embodiments may further include a flow control system for automatically controlling the speed of the motors for particular applications, such as flow control in a pool.

In a first embodiment of the present invention, a dual motor system may include a first motor, a second motor, a common shaft, and a motor control system. The first motor may be of a first type and include a first stator and a first rotor providing a lower speed range under a first type of control. The second motor may be of a second type and include a second stator and a second rotor providing a higher speed range under a second type of control. The first and second motors may be coaxially arranged and aligned on a common axis defined by the common shaft and configured to drive the common shaft. The motor control system may be configured to control the first motor and engage the second motor as desired or needed to control a speed of the common shaft.

Various implementations of the first embodiment may include any one or more of the following features. The first motor may be a variable speed synchronous motor, the lower speed range may be a lower two-thirds of a full speed range, and the first type of control may be a variable speed drive. The lower speed range may be up to approximately between two thousand eight hundred and three thousand revolutions per minute. The second motor may be an asynchronous induction motor, the higher speed range may be an upper one-third of a full speed range in the form of one or more discrete fixed speeds, and the second type of control may be a non-variable speed drive. The higher speed range may be defined by one or more higher speeds over approximately three thousand revolutions per minute. A first higher speed may be approximately between three thousand two hundred and three thousand three hundred revolutions per minute, and a second higher speed may be approximately between three thousand four hundred and three thousand five hundred revolutions per minute.

The motor control system may further include a high voltage motor controller providing variable speed control of the first motor, a relay for engaging and disengaging the second motor, and a switching logic configured to send an engagement signal to the relay to engage the second motor when the higher speed range is required and to send a disengagement signal to the second motor when the higher speed range is no longer required. When the higher speed range is required, the motor control system may increase a speed of the first motor until a first highest speed of the lower speed range, and then the motor control system may engage the second motor to achieve the higher speed range. When the second motor is engaged to achieve the higher speed range, the motor control system may run both the first and second motors, with the first motor being current limited.

The system may further include a run capacitor for the second motor, wherein the run capacitor may have a size which maximizes a power factor, and the first type of control may have no power factor correction. The system may further include a transformer coupled with the second motor and include a first tap on a winding of the transformer which may be selectable by the motor control system to provide a first higher speed, and a second tap on the winding of the transformer which may be selectable by the motor control system to provide a second higher speed. The motor control system may further include a corresponding relay connected to a corresponding tap on the winding of the transformer for each of the higher speeds, wherein the motor control system may engage the second motor and select one of the first and second higher speeds by switching the particular corresponding relay connected to the particular corresponding tap on the winding of the transformer. The motor control system may include a relay having a corresponding position connected to a corresponding tap on the winding of the transformer for each of the higher speeds, wherein the motor control system may engage the second motor and select one of the first and second higher speeds by switching the relay to the particular corresponding position connected to the particular corresponding tap on the winding of the transformer.

In a second embodiment of the present invention, a dual motor system with flow control may include a first motor, a second motor, a common shaft, a pump, and a motor control system including a flow control system. The first motor may be of a first type including a first stator and a first rotor providing a lower speed range under a first type of control. The second motor may be of a second type including a second stator and a second rotor providing a higher speed range under a second type of control. The first and second motors may be coaxially arranged and aligned on a common axis defined by the common shaft and configured to drive the common shaft. The pump may be coupled with and be driven by the common shaft and may be configured to pump a volume of a fluid. The motor control system including the flow control system may be configured to control the first motor and engage the second motor as desired or needed to control a speed of the common shaft and the pumping of the volume of the fluid by the pump.

Various implementations of the second embodiment may include any one or more of the following features. The flow control system may provide at least four speeds, wherein a lowest speed is not more than one-half of a highest speed, the system may run at a two higher speeds for no more than twelve hours in a twenty-four hour period, and the system may not run continuously at the highest speed for more than two hours in the twenty-four hour period. The at least four speeds may include a first speed which is between thirty and forty percent of the highest speed, a second speed which is between forty-five and fifty-five percent of the highest speed, a third speed which is between seventy-five and eighty-five percent of the highest speed, and a fourth speed which is the highest speed. The pump may move a maximum volume of the fluid through a filter in the twenty-four hour period by using the second speed continuously for twelve hours and the fourth speed continuously for twelve hours. The pump may move a minimum volume of the fluid through a filter in the twenty-four hour period by using the first speed continuously for twenty-four hours.

The flow control system may include at least three cycles, including an energy saving cycle in which twice the volume of the fluid is moved by the pump through a filter in a twenty-four hour period, a maximum filtering cycle in which the volume of the fluid is moved through the filter at a maximum filtering capacity of the filter, and an intermediate cycle in which an average volume of the fluid between the energy saving cycle and the maximum filtering cycle is moved through the filter using a first speed which is between thirty and forty percent of a highest speed. The flow control system may include a cleaning mode in which the dual motor system runs at a highest speed for no more than thirty minutes.

A flow rate corresponding to each speed of the at least four speeds may be used by the flow control system to determine a plurality of performance options to accomplish moving a volume of the fluid through a filter in the twenty-four hour period, wherein each performance option provides a different total flow amount. Each performance option may be selectable using an electronic interface and the flow control system using a real-time clock to engage a selected performance option at an indicated time, may be selectable by sending a wireless signal via an electronic communications medium to the flow control system, may be selectable by manually adjusting an analog potentiometer coupled with the flow control system, and/or may be selectable using a binary coded potentiometer coupled with the flow control system.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1 is a block diagram of an embodiment of a dual motor system including first and second motors providing lower and higher speed ranges and being coaxially arranged and aligned on a common axis defined by a common shaft and configured to drive a common shaft, and a motor control system including a flow control system automatically controlling the speed of the motors for particular applications, such as flow control in a pool;

Figure 4:
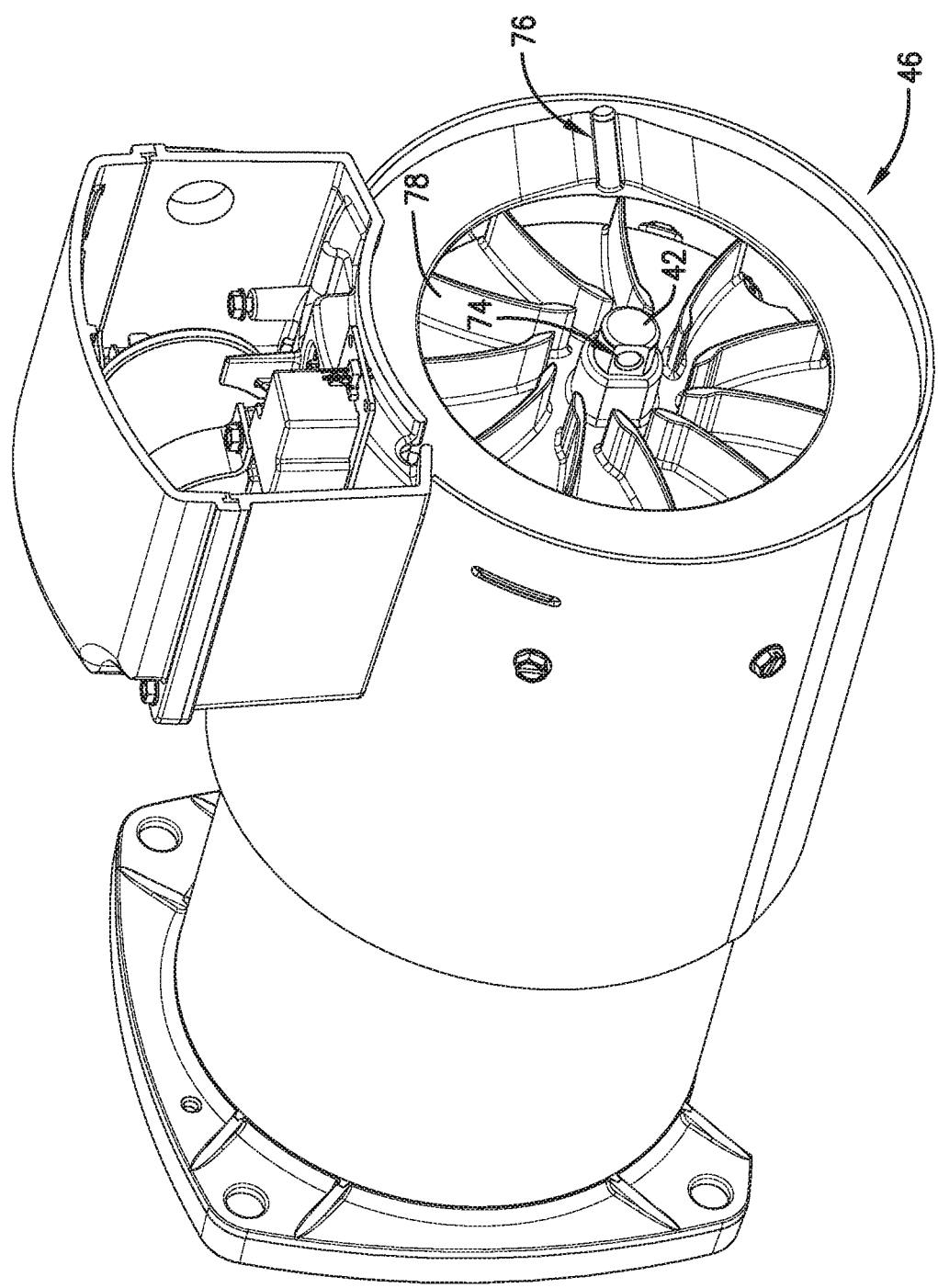
FIG. 4 is a fragmentary isometric view of an embodiment of a shaft-locking feature which may be incorporated into the system of FIG. 1, wherein a hole is provided in the shaft for receiving an implement in order to immobilize the shaft and thereby facilitate a task.
Figure 10:
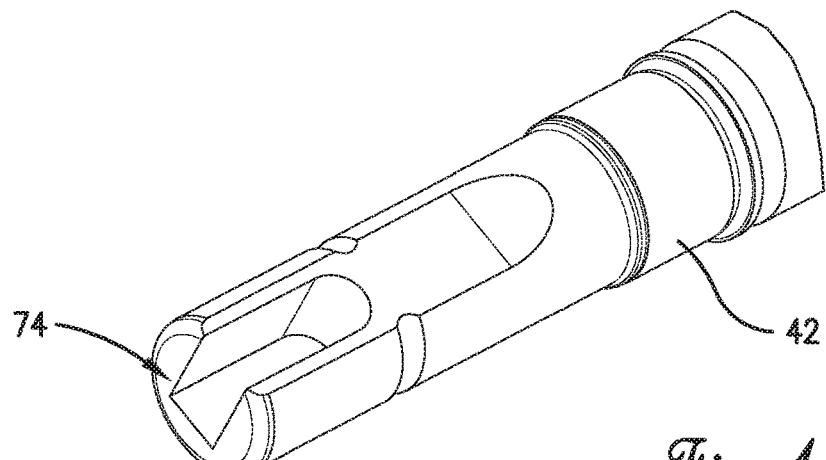

FIG. 10 is a fragmentary cross-sectional perspective view of the end portion of the shaft showing an elongated, blind, and open version of the hole which may be used in the feature of FIG. 4; and FIG. 11 is an implementation of the shaft-locking feature of FIG. 4, wherein a cover or guard element is provided on a housing, and a hole is provided in the cover or guard element through which to insert the implement into the hole in the shaft.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, embodiments provide a dual motor system including a first motor providing a lower speed range under a first type of control and a second motor providing a higher speed range under a second type of control, wherein the motors are coaxially arranged and aligned on a common axis defined by a common shaft (i.e., one motor located physically behind the other motor and the rotors of both motors being fixed to the common shaft) and configured to drive the common shaft, and a motor control system configured to control the first motor and engage the second motor as desired or needed to drive the common shaft. Embodiments may further include a flow control system for automatically controlling the speed of the motors for particular applications, such as flow control in a pool.

In one implementation, the first motor may be a variable speed three-phase synchronous motor providing approximately a lower two-thirds of the full speed range with a variable speed drive, and the second motor may be a one- or three-phase asynchronous induction motor providing approximately an upper one-third of the full speed range in the form of one or more discrete fixed higher speeds, with a non-variable speed drive. In operation, the motor control system may engage only the first motor under the first type of control until the rotational speed of the shaft reaches a maximum speed of the lower speed range, and then the motor control system may engage the second motor under the second type of control to achieve the one or more higher speeds of the higher speed range. Various implementations of the system may include one or more additional motors and controls which may be of the first or second types or one or more different types as desired or needed for particular applications.

Embodiments may provide a number of advantages over the prior art. For example, the size of the variable speed drive may be reduced, which enables better integration into the system, and the cost of the drive may be significantly reduced because power is reduced. A standalone drive may be used rather than an integrated drive. Losses due to the variable speed drive may be reduced at full power because only a part of the total power goes through the drive, thereby increasing total efficiency compared to fully variable speed systems. Low inrush current may occur only during starting and acceleration because this phase of operation only involves the variable speed drive. There may be no need for "fly catching" during speed reduction from full speed because the drive is continuously active. Electrical noise and conducted and radiated electromagnetic noise may be reduced compared to fully variable speed systems because only part of the total power is delivered by the drive.

Potential applications include pool and spa pumps, general centrifugal pumps (e.g., jet pumps, booster pumps, irrigation pumps), fans, centrifuges, compressors, and, in general, substantially any variable torque applications, such as vacuum pumps, mixers, and centrifuges, in residential, commercial, or industrial contexts. Typically, mixers initially require very high torque and low speed, and then subsequently increase speed. In one implementation, this may be achieved using an eight, six, or four pole induction motor together with the synchronous motor at lower speeds, and using only the brushless permanent magnet (BPM) motor and inverter at higher speeds. Typically, centrifuges initially require high torque because of the high inertias of their payloads, then accelerate and remain at higher speeds using only the BPM motor, and then require high torque in generative mode to slow the payload. In one implementation, the induction motor may be used to slow the payload from higher speeds without oversizing the drives in regenerative mode.

Figure 1:
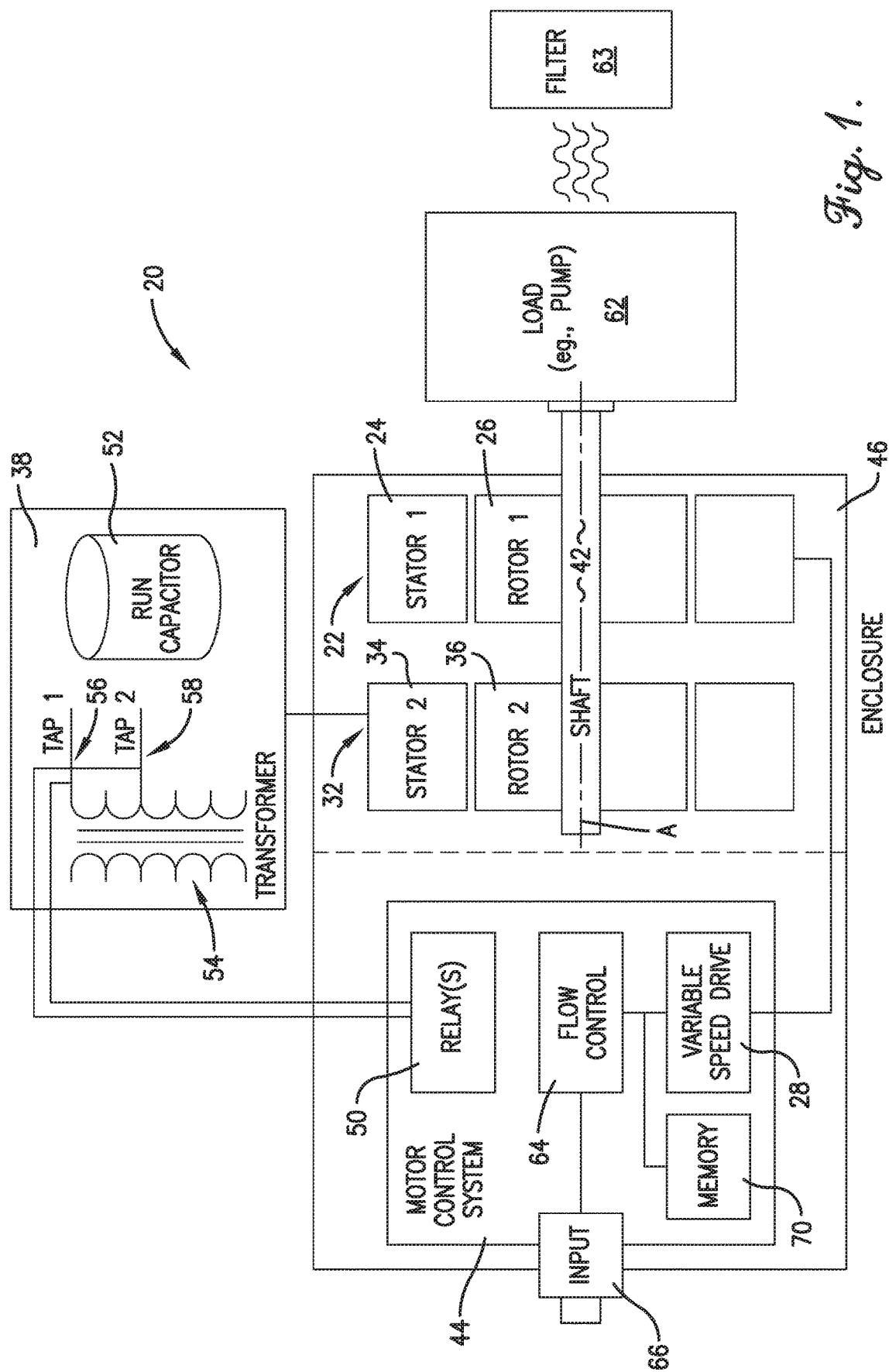
Figure 2:
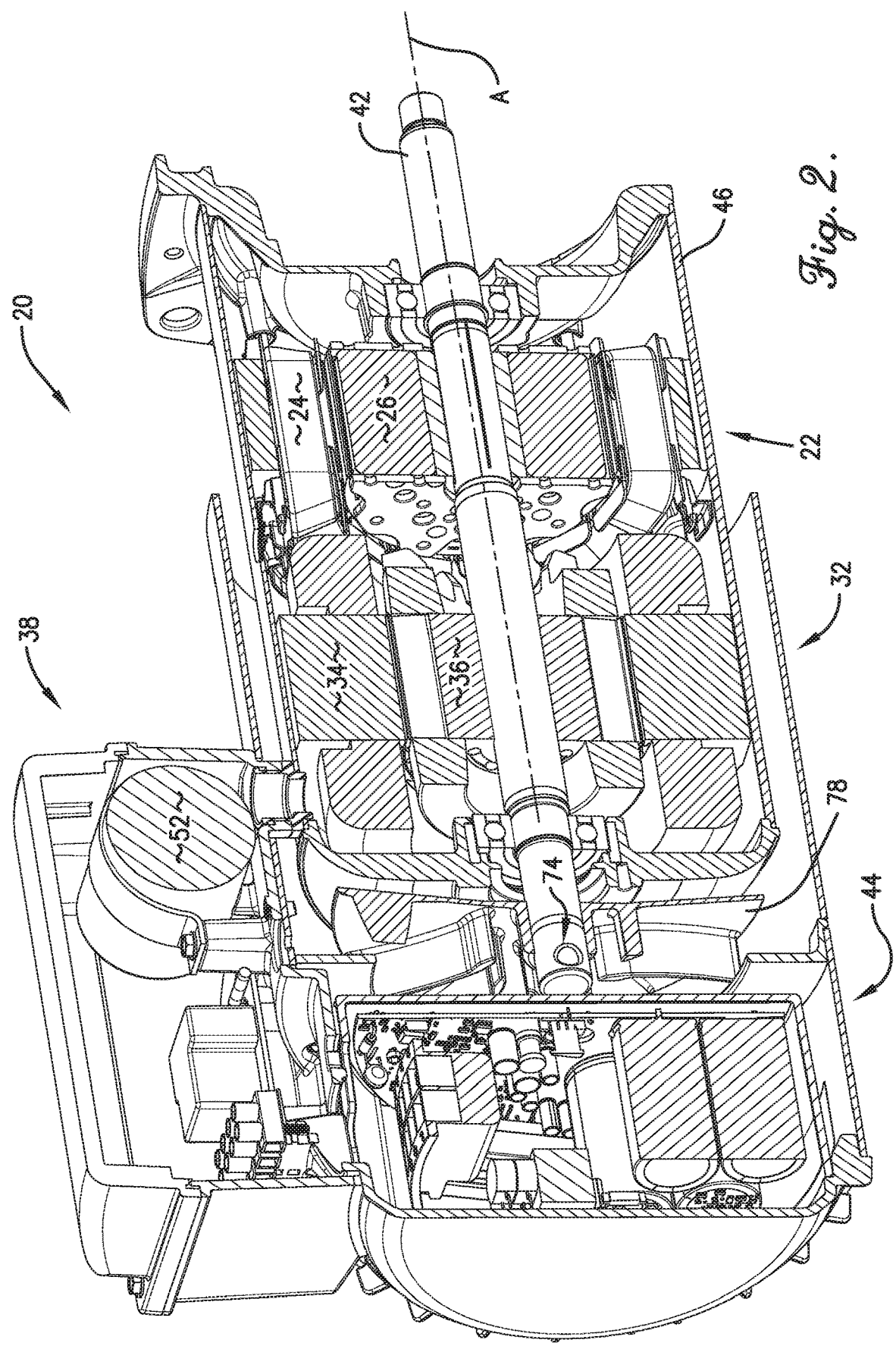
FIG. 2 is a cross-sectional elevation view of an implementation of the dual motor system of FIG. 1.

Referring to FIGS. 1 and 2, a first embodiment of a dual motor system 20 may, include a first motor 22 of a first type including a first stator 24 and a first rotor 26 providing a lower speed range under a first type of control 28, a second motor 32 of a second type including a second stator 34 and a second rotor 36 providing a higher speed range under a second type of control 38, a common shaft 42 on which the motors 22, 32 may be coaxially arranged and aligned on a common axis "A" defined by the common shaft, and a motor control system 44 configured to control the first motor 22 and engage the second motor 32 as desired or needed to drive the common shaft 42. In operation, the motor control system 44 may engage only the first motor 22 under the first type of control until 28 the rotational speed of the shaft 42 reaches a maximum speed of the lower speed range, and then the motor control system 44 may engage the second motor 32 under the second type of control 38 to achieve the one or more higher speeds of the higher speed range.

In an implementation of the system 20, the first motor 22 may be a variable speed three-phase synchronous motor providing approximately a lower two-thirds of the full speed range with a variable speed drive 28, and the second motor 32 may be a one- or three-phase asynchronous induction motor providing approximately an upper one-third of the full speed range, in the form of one or more discrete fixed speeds, with a non-variable speed control. In various other implementations, the first and second motors 22, 32 may both be synchronous motors or may both be asynchronous motors and may differ in type in some other way. In one implementation involving two synchronous motors, one motor may operate in torque control mode while the other motor operates at a fixed speed direct-on-line. The motors 22, 32 may be coaxially arranged and aligned on the common axis defined by the common shaft 42, with the rotors 26, 36 of both motors 22, 32 being fixed to the common shaft 42, and the motor control system 44 may be configured to engage the motors 22, 32 as desired or needed. In various implementations, a common housing or enclosure 46 may be shared by the motors 22, 32, and the motor control system 44 may include a common inverter shared by the motors 22, 32.

The variable speed synchronous first motor 22 may incorporate substantially any suitable technologies, and so may, for example, use three-phase power and may have any number of poles to optimize its size, the first stator 24 may be a conventional or segmented stator and/or the first rotor 26 may be a BPM or conventional cast induction (e.g., synchronous) rotor to improve power split control between the first and second motors 22, 32. In at least one application, the first motor 22 may provide fully variable speeds approximately between zero and two thousand eight hundred to three thousand revolutions per minute (RPM).

The asynchronous induction second motor 32 may incorporate substantially any suitable technologies, and so may, for example, use one- or three-phase power, may employ rotor core technology, and may use conventional winding. In at least one application, the second motor 32 may provide one or more discrete higher speeds over three thousand RPM.

The second motor 32 may be an induction motor so that the higher speed(s) correspond to a synchronous speed of the induction motor minus its slip at a defined nominal power. A power split between the first and second motors 22, 32 may be controlled by using the variable speed drive 28 to adjust the speed of the shaft 42 toward the higher speed(s) until the first motor 22 delivers a predefined rated torque and delivers a first power. The total power on the shaft 42 may be equal to a driven load power requirement, so with the first power being predefined, the nominal power is equal to the driven load power requirement minus the predefined first power. The motor control system 44 may control one or more relays 50 for engaging the second motor 32 so that there is no high transient current when closing or opening the relay(s) 50. A transient overload capability of the motor control system 44 may be used to be as close as possible to the higher speed(s) before closing or opening the relay(s) 50. The relay(s) 50 may be located in the same or different enclosure 46.

In the case of a single phase main supply, a run capacitor 52 may be used for the second motor 32 because the acceleration phase is ensured by the first motor 22 and the variable speed drive 28. The run capacitor 52 for the second motor 32 may be located in the same or a different enclosure 46. With the second motor 32 working only at full power and full speed, the efficiency of the second motor 32 may be optimized on this working point, and with the second motor 32 working only on one working point at highest speed, the run capacitor 52 may be sized to maximize power factor, thereby eliminating the need for a power factor correction on the variable speed drive 28 which only delivers a part of full power.

The motor control system 44 may be configured to engage the first motor 22 under the variable speed drive 28 to provide the lower range of speeds, and to engage the second motor 32 as desired or needed to provide the higher range of one or more discrete fixed higher speeds, thereby driving the shaft 42 and a load (e.g., a pump) coupled with the shaft 42 at desired or needed speeds. The motor control system 44 may include software, firmware, or hardware which, as desired or needed, sends a signal to the one or more relays 50 to engage the second motor 32 to provide additional power. In one implementation, when the second motor 32 is engaged to achieve the higher speeds, the motor control system 44 may run both motors 22, 32 in tandem, but the first motor 22 may be current limited in this situation.

In one implementation, the variable speed drive 28 of the motor control system 44 may control the first motor 22 until the first motor 22 reaches a maximum speed of the lower speed range. If the higher speed range is called for, the motor control system 44 may close a relay 50 to engage the second motor 32 which may provide a generally constant power and a transient ramp-up to increase the speed of the shaft 42 from the maximum lower speed to the higher speed(s). Thus, the total power at the higher speed(s) may be the sum of the powers of the two motors 22, 32.

In a first example application, the system 20 may provide 2.7 total horsepower (THP) and include a 2.2 THP, 230 V, synchronous reluctance, 3100 RPM variable speed first motor 22 and a 0.5 THP, 230 V, 2-pole, 1-phase inductance second motor 32. In a second example application, the system 20 may provide 3.45 THP and include a 2.3 THP, 230 V, synchronous reluctance, 2900 RPM variable speed first motor 22 and a 1.2 THP, 230 V, 2-pole, 1-phase inductance second motor 32. In each of these example applications, four preset speed buttons may be provided with no user interface, no power factor correction may be required as only part of the power is delivered by the variable speed drive 28, the switching relay(s) 50 and the run capacitor 52 may be provided in a separate drive box. The two pole, single phase, second motor 32 may be optimized only on a nominal point, and the second motor 32 may only be switched on when close to the nominal speed. A low resistance second rotor 36 may be used to maximize efficiency. The first motor 22 may run at constant power at its highest speed but may, bring the system as close as possible to its highest speed before engaging the second motor 32.

With regard to the second motor 32 and achieving the higher speed(s), the system 20 may further include a transformer 54 including a first winding tap 56 on the transformer 54 which provides a first higher speed of at least two higher speeds, and a second winding tap 58 on the transformer 54 which provides a second higher speed of the at least two higher speeds. Additional taps may be provided as desired or needed to achieve additional higher speeds.

In one implementation, the first higher speed may be approximately between three thousand and three thousand five hundred RPM, or approximately between three thousand two hundred and three thousand three hundred RPM, or approximately three thousand two hundred and fifty RPM, and the second higher speed may be approximately between three thousand two hundred and three thousand seven hundred RPM, or approximately between three thousand four hundred and three thousand five hundred RPM, or approximately three thousand four hundred and fifty RPM. In one implementation, the higher speeds may be preselected at the factory and/or selectable or reselectable during installation or maintenance by changing the locations of the taps 56, 58 on the windings.

In one implementation, the motor control system 44 may include a number of relays 50 equal to the number of higher speeds, wherein the motor control system 44 engages the second motor 32 and selects a desired higher speed by switching the corresponding relay 50 to select the corresponding tap 56, 58 on the transformer 54. In an alternative implementation, the motor control system 44 may include a single relay 50 having a number of positions equal to the number of higher speeds, wherein the motor control system 44 engages the second motor 32 and selects a desired higher speed by switching the corresponding position of the relay 50 to select the corresponding tap 56, 58 on the transformer 54.

Figure 3:
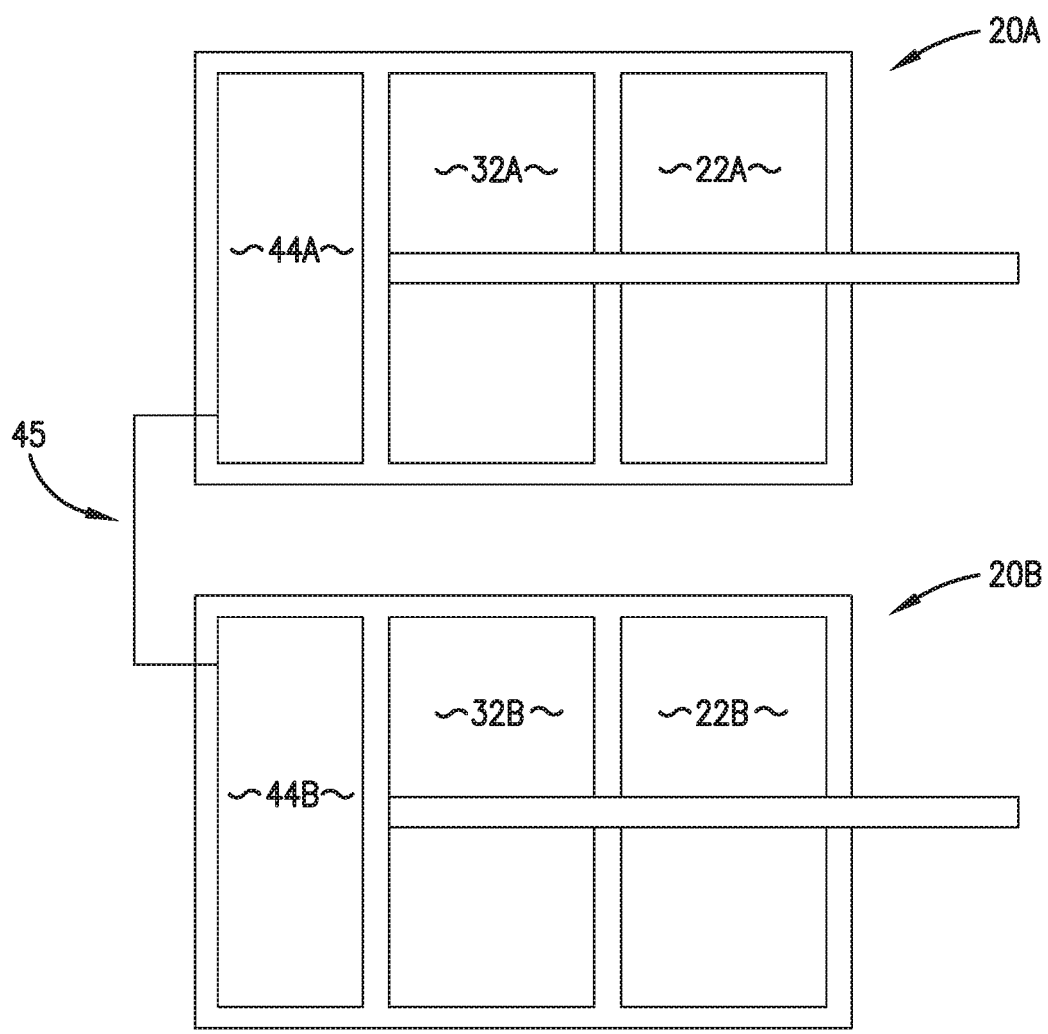
FIG. 3 is a block diagram of a plurality of the dual motor systems of FIG. 1 cooperatively operating in parallel.

Referring also to FIG. 3, in an example application, first and second of the above-described systems 20A, 20B may be operated in parallel, with each system including two coaxially arranged and aligned motors 22A, 32A, 22B, 32B controlled in dual mode by their own motor control system 44A, 44B, and the motors combining their effects to produce the energy required for the application. Each system may then be controlled as a function of the requirements of the application, with four possible control schemes: One system may be driven at a lower variable speed while the other system may be inactive when the requirement for energy is lowest; both systems may be driven at lower variable speeds; one system may be driven at a higher fixed speed and the other system may be driven at a lower variable speed; and both systems may be driven at higher fixed speeds when the requirement for energy is highest.

The use of two motor control systems 44A, 44B operating in parallel enables fine control of the energy produced by the combined systems over a wider range of power. The motor control systems 44A, 44B may exchange between them via a communications link 45 information for controlling the respective powers and the corresponding switches, with, for example, one functioning as master and the other as slave. A relatively high energy saving is achieved the energy requirement of the application with the systems at maximum power represents between ten percent and seventy five percent of the total use of the application, and the energy saving is even higher at between ten percent and fifty percent. Potential applications for configuration may include producing compressed air, refrigeration, ventilation (of, e.g., a tunnel), and cascaded pumping systems.

In one implementation, a chopping frequency of the variable speed drives may be varied according to whether the latter functions in continuous service in the variable speed operating mode without exceeding its nominal power or during the acceleration preceding switching to the second motor 32A, 32B powered by the mains supply. As a general rule, decreasing the chopping frequency may increase the losses of the motor.

Figure 5:
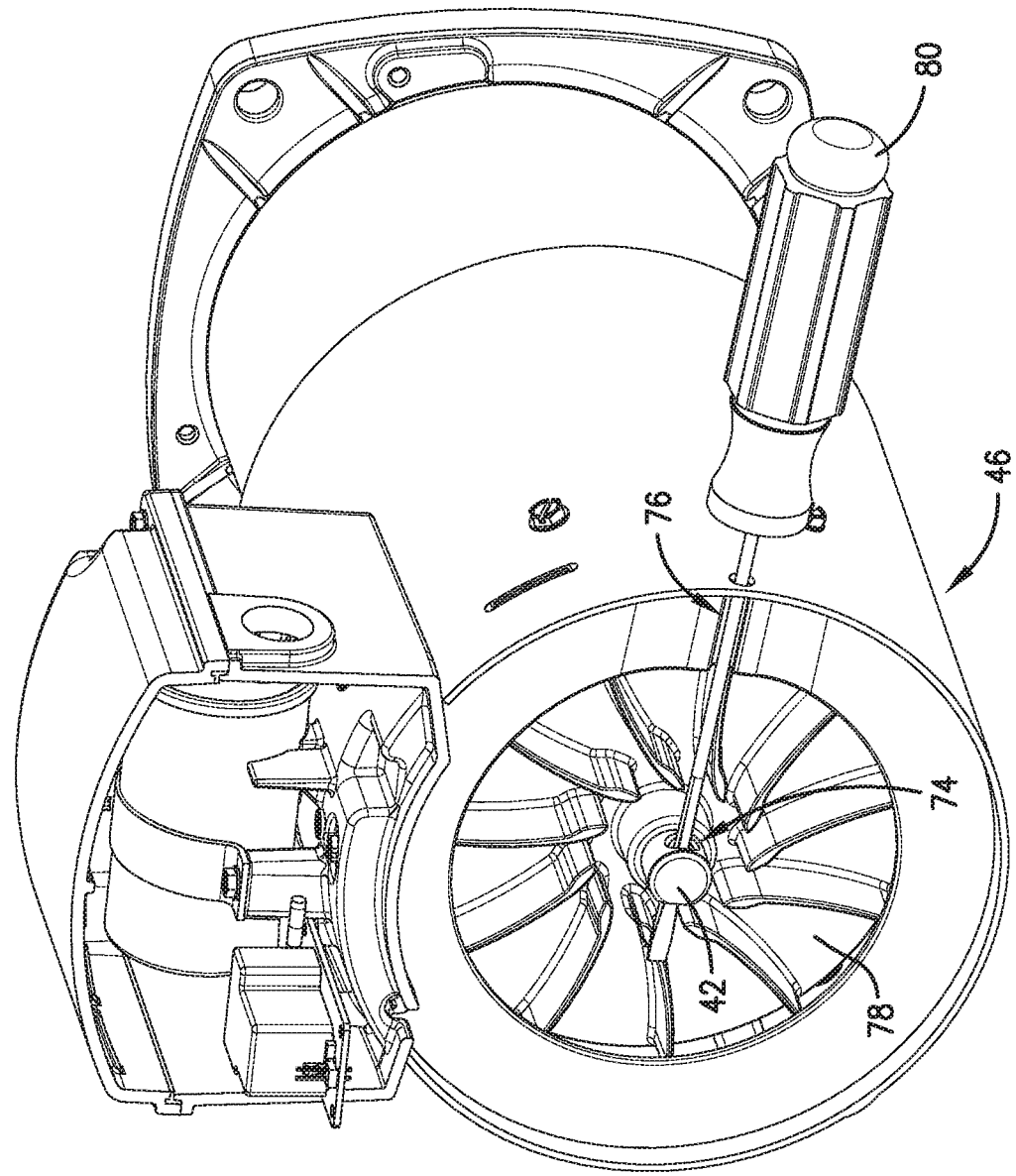
FIG. 5 is a fragmentary perspective view of the shaft-locking feature of FIG. 4 in operation, wherein a screwdriver is shown inserted into the hole in the shaft.
Figure 6:
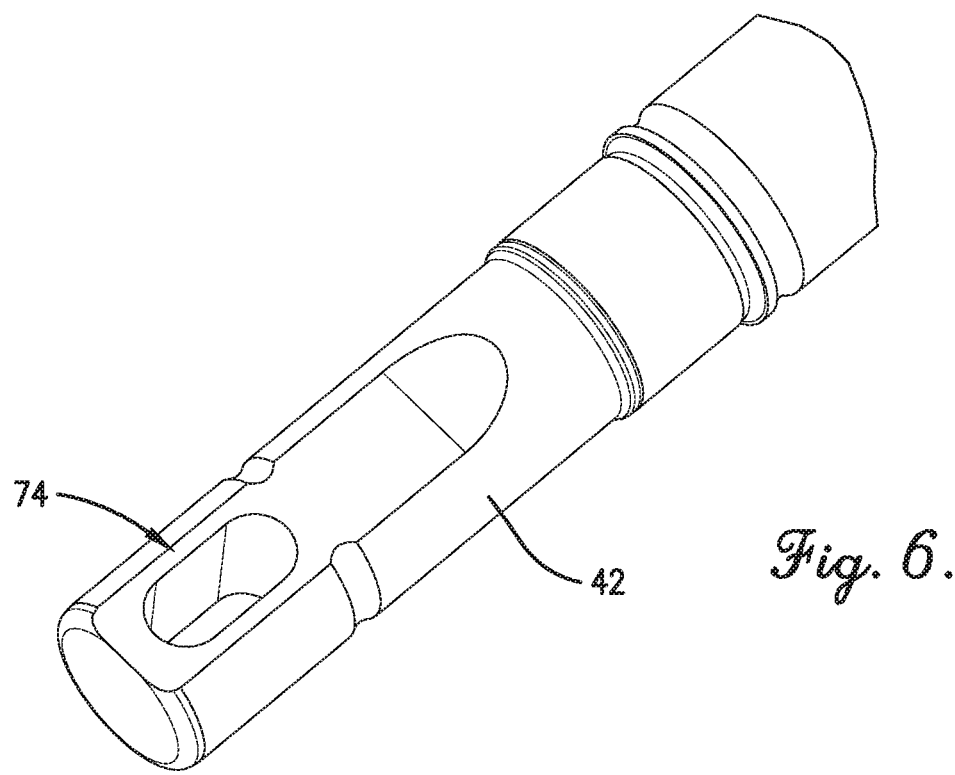
FIG. 6 is a fragmentary perspective view of an end of the shaft showing an elongated and through version of the hole which may be used in the feature of FIG. 4.
Figure 7:
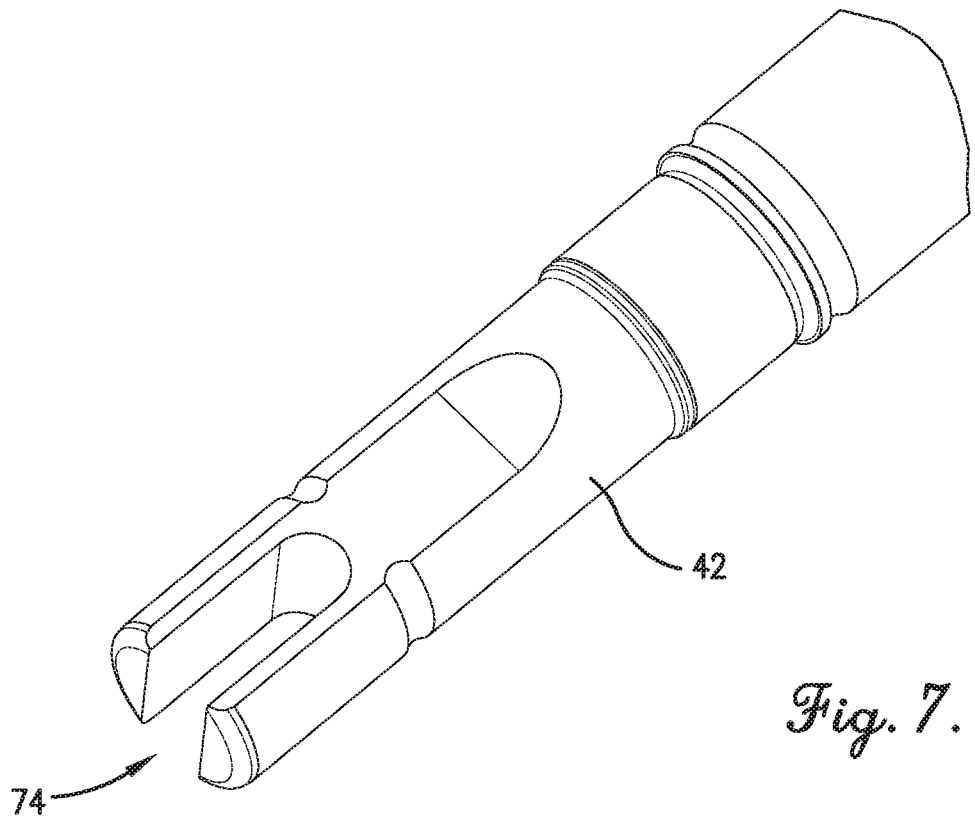
FIG. 7 is a fragmentary perspective view of the end portion of the shaft showing an elongated, through, and open (i.e., notch) version of the hole which may be used in the feature of FIG. 4.
Figure 8:
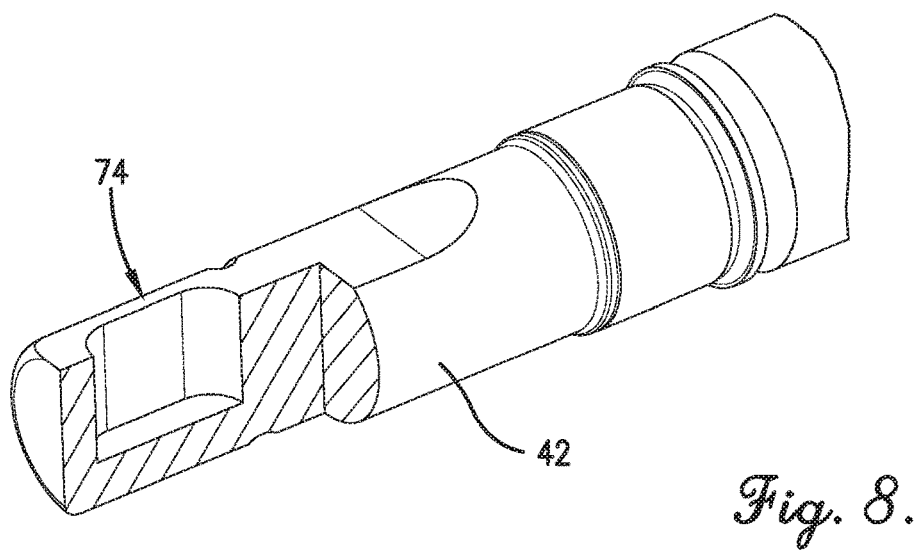
FIG. 8 is a fragmentary cross-sectional perspective view of the end portion of the shaft showing an elongated and blind (i.e., partially through) version of the hole which may be used in the feature of FIG. 4.
Figure 9:
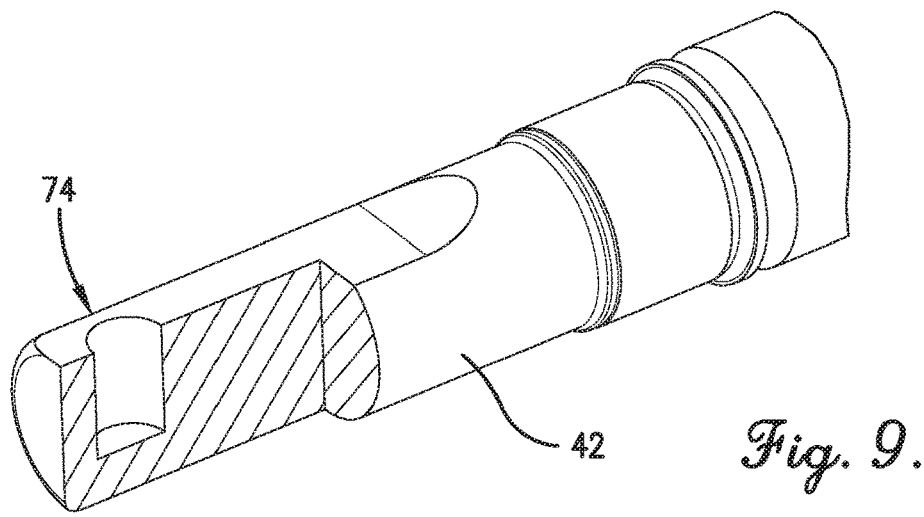
FIG. 9 is a fragmentary cross-sectional perspective view of the end portion of the shaft showing a round and blind version of the hole which may be used in the feature of FIG. 4.

Referring also to FIGS. 4-11, the embodiments and implementations described herein may include the following additional shaft-locking feature. Although described and illustrated in conjunction with the dual motor system, the shaft-locking feature has potential application to and may be incorporated into substantially any suitable conventional or non-conventional electric motor system having shaft. Broadly, a first hole 74 may be provided in an end of the shaft 42 to receive a screwdriver or other elongated rod or rod-like implement 80 (as seen in FIGS. 4 and 5) to facilitate immobilizing the shaft 42 to perform a task (e.g., the installation or removal of an attachment such as an impeller 78). The first hole 74 may be circular, elongated, through, blind, closed, and/or open (i.e., a notch in the end of the shaft). For example, the first hole 74 may be a round through hole (seen in FIGS. 4 and 5), an elongated through hole (FIG. 6), an elongated through notch (FIG. 7), an elongated blind hole (FIG. 8), or a round blind hole (FIG. 9), or an elongated blind notch (FIG. 10). For many applications, the first hole 74 may be approximately between one-tenth inch and one inch in diameter or width, while for other applications, the width and material of the shaft 42 and the torque to be applied to the shaft 42 may determine the size of the first hole 74.

In one implementation, a second hole 76 may be provided through the housing 46, wherein the second hole 76 is alignable with the first hole 74 (by rotating the shaft 42) to allow for inserting the implement 80 through the housing 46 and into the shaft 42 to immobilize the shaft 42. The second hole 76 may have any of the shapes described above for the first hole 74. In one implementation, the second hole 76 may be provided in a cover or guard element 82 portion of the housing 46 (as seen in FIG. 11). For example, installing or removing an impeller 78 may require that the shaft 42 be prevented from rotating. Conventionally, this would involve holding the shaft 42 with a hand or clamping the shaft with a tool (e.g., pliers), which can be inconvenient and clumsy, and then screwing the impeller 78 on to or off of the shaft 42. The shaft-locking feature allows for inserting a screwdriver 80 through the second hole 76 in the housing 46 and rotating the shaft 42 until the screwdriver 80 enters the first hole 74 in the shaft 42, and thereby allows for conveniently and easily preventing the shaft 42 from turning while installing or removing the impeller 78.

Referring again to FIGS. 1 and 2, in a second embodiment of the dual motor system 20, the shaft 42 may drive a pump 62, and the motor control system 44 may further include a flow control system 64 configured to automatically control engagement and disengagement of the first and second motors 22, 32 to control the speed of the pump 62 as desired or needed for particular applications, such as flow control in a pool based on water volume and/or applicable federal, state, local, or other regulations which limit motor speeds to control energy usage. Embodiments advantageously allow for varying flow and meeting regulations while using a drive which is approximately one-half the size of a conventional pool pump motor drive. In one embodiment the pump 62 may include or otherwise cooperate with one or more fixed or removable filters or filter elements 63 through which the pump moves the water or other fluid in order to remove debris and/or other undesirable material from the fluid.

In an example pool pump flow control application, the flow control system 64 may provide a minimum of four speeds, including at least two speeds (i.e., a lowest speed and one or more other speeds) in the lower speed range and at least two speeds in the higher speed range (i.e., a highest speed and one or more other speeds), wherein the lowest speed may not be more than one-half of the highest speed, the system must run at the two higher speeds for less than twelve hours in a twenty-four hour period, and the system may not continuously run for more than two hours at the highest speed. Given the volume of water in a pool, which may be entered or otherwise provided using an input mechanism 66 of substantially any suitable technology (e.g., a knob, keypad, software application) and stored in an electronic memory 70, water may be made to circulate a particular number of times per day. Further, it may be desirable to run at a higher speed for cleaning (vacuuming), skimming (vacuuming to pull into the filter), and/or to run a water feature (e.g., a fountain in the pool). The flow control system 64 may use the flows corresponding to the four speeds to calculate different performance options to accomplish moving a desired volume of water for the pool through the filter in a twenty-four hour period, wherein the options provide different total flow levels. For example, a performance option to clean the pool may correspond to maximum flow. Preferably, all of the performance options may meet applicable regulations. The performance options may be stored in the electronic memory 70. The selected option specifies one or more particular speeds and durations, and the motor control and flow control systems 44, 64 implements the selected option by controlling the first and second motors 22, 32 accordingly.

A desired performance option may be selected using the input mechanism 66 which may employ substantially any suitable technology. For example, a desired performance option may be selected using a human-machine interface that includes a real-time clock in the flow control system 64 to engage the selected option at an indicated time. For another example, a desired performance option may be sent via a communications medium (wired or wireless, e.g., Bluetooth, WiFi, cellular) to the flow control system 64. For yet another example, a desired performance option may be entered using an analog potentiometer. For example, the cleaning option or mode may be the maximum value of the potentiometer. For yet another example, a desired option may be entered using a binary coded potentiometer that uses discrete inputs in the flow control system 64 to select a discrete set of options, e.g., three discrete inputs may be used to select seven flow options, including the cleaning option or mode.

In one implementation; the flow control second embodiment may control motor operation as follows. There may be at least four speeds of SP1, SP2, SP3, and SP4, which, again, may include two speeds in the lower range and two speeds in the higher range. Given a highest speed, SP4, of three thousand four hundred fifty RPM, SP1 may be between thirty, percent (one thousand thirty-five RPM) and forty percent (once thousand three hundred and eighty RPM) of the highest speed; SP2 may be between forty-five percent (one thousand five hundred and fifty-three RPM) and fifty-five percent (once thousand eight hundred and ninety-eight RPM) of the highest speed; and SP3 may be between seventy-five percent (two thousand five hundred and eighty-eight RPM) and eighty-five percent (two thousand nine hundred and thirty-three RPM) of the highest speed. Each speed may run for a respective time (in hours) of t1, t2, t3, and t4, wherein (t1+t2) must be greater than (t3+t4) and t4 may not exceed two hours in a twenty-four hour period. Each speed may result in a respective pump flow (in gallons per hour) of PF1, PF2, PF3, and PF4. PF1, PF2, and PF3 may be calculated from PF4, wherein Pfn=SPn/SP4*PF4. All other parameters to define running cycles may be calculated automatically in the drive, the user interface, or in the software application.

In a first example application, in which the system 20 may provide 2.7 THP and include a 2.2 THP, 230 V, synchronous reluctance, three thousand one hundred RPM variable speed first motor 22 and a 0.5 THP, 230 V, 2-pole, 1-phase inductance second motor 32, the flow control may involve the following: SP1=1380 RPM or 40% of highest speed, SP4; SP2=1898 RPM or 55% of SP4; SP3=2650 RPM or 76.8% of SP4; and SP4=3450 RPM. In a second example application, in which the system 20 may provide 3.45 THP and include a 2.3 THP, 230 V, synchronous reluctance, two thousand nine hundred RPM variable speed first motor 22 and a 1.2 THP, 230 V, 2-pole, 1-phase inductance second motor 32, the flow control may similarly, involve the following: SP1=1380 RPM or 40% of SP4; SP2=1898 RPM or 55% of SP4; SP3=2650 RPM or 76.8% of SP4; and SP4=3450 RPM.

In this implementation, the pump 62 may be required to be able to run continuously and to move at least twice the water volume (in gallons) of the pool through the filter in a twenty-four hour period. The pump 62 may move a maximum water volume through the filter in a twenty-four hour period by using the second speed continuously for twelve hours and the fourth speed continuously for twelve hours, with maxWV=(PF2*12+PF4*12)/2, and maxWV>WV. The pump 62 may move a minimum water volume through the filter in a twenty-four hour period by using the first speed continuously for twenty-four hours, with minWV=(PF1*24)/2, and minWV<WV. The water volume of the pool may be entered using the input mechanism 66, which may be a potentiometer, without the need to connect to the main supply, wherein the water volume of the pool is a percentage between minWm(=0%) and maxWM(=1.00%). The potentiometer may be initially set such that the pump 62 moves at least twice the water volume of the pool through the filter in a twenty-four hour period running continuously at the second speed for the twenty-four hour period. So, minWV=PF1*24 is 0% potentiometer; max WV=PF2*12+PF4*12 is 100% potentiometer; and recWV=PF2*24 potentiometer factory position.

The flow control system 64 may include at least three cycles which are selectable using the potentiometer. An energy saving cycle may be provided in which twice the water volume is moved through the filter in a twenty-four hour period. A maximum filtering cycle may be provided in which the water volume is moved through the filter at a maximum filtering capacity of the filter. An intermediate cycle may be provided in which an average water volume between the energy saving cycle and the maximum filtering cycle is moved through the filter using a lowest possible speed. Examples of the intermediate cycle may include the following:

$$t1(cycle2)=(t1(cycle1)+t1(cycle3))/2$$

$$t2(cycle2)=(t2(cycle1)+t2(cycle3))/2$$

$$t3(cycle2)=(t3(cycle1)+t3(cycle3))/2$$

$$t4(cycle2)=(t4(cycle1)+t4(cycle3))/2$$

A user may use the input mechanism 66 to manually set the system to the fourth speed for the cleaning option or mode for up to thirty minutes, wherein this usage of the fourth speed counts against the limit of (t3+t4) being less than twelve hours in a twenty-four hour period. If the limit is reached, cleaning mode may be disabled for the remainder of the twenty-four hour period.

In an example implementation, a user may use a software application on a smartphone or similar communications device (e.g., a laptop or tablet computer) to provide input information via the input mechanism 66 (which may include a wireless transceiver) to the flow control system 64 as follows to manage operation. The system 64 may ask the user to state the number of gallons (GAL) in the pool. If the user does not know this information, the user may be asked to state the dimensions of the pool or may be asked for other information from which the system may calculate or look-up (in electronic memory) the corresponding GAL. The system 64 may ask the user to state the number of gallons per minute (GPM) capacity of the pump. If the user does not know this information, the user may be asked the total horsepower of the dual motor system or may be asked for other information from which the system may calculate or look-up the GPM. The system 64 may ask the user to state the number of times the water should turnover (TURN) in a twenty-four period. If the user does not know this information, the system 64 may recommend a particular number (e.g., two) and ask the user to confirm the recommended TURN. The system 64 may ask the user to state the number of hours (HOURS) to operate the pump in a twenty-four hour period. If the user does not know this information, the system 64 may default to a particular number (e.g., eighteen or twenty-four) and ask the user to confirm the default HOURS.

Given this information, the system 64 may calculate an optimal GPM (BASE GPM) as GAL/((60*HOURS)/TURNS), wherein BASE GPM<=GPM. The system 64 may calculate a first speed for thirty-one minutes of every hour of operation as BASE GPM-10 GPM; MIN=0.16*GPM, MAX=GPM. The system 64 may calculate a second speed for the remaining twenty-nine minutes of every hour of operation as BASE GPM+11 GPM; MAX=GPM. If 18 hours of operation are specified, then Pump GPM Capacity/2*18=Gallons of water pumped per day; if Gallons of water pumped per day>(Gallons in pool*turnover), then (Gallons in pool*turnover)/(GPM/2*60)=Hours on Low Speed (hours on High Speed=0), else ((Gallons in Pool*turnover)–Gallons of water pumped per day)/GPM=Hours on High Speed; Run Time per Day=Hours on Low Speed+Hours on High Speed. If 24 hours of operation are specified; then Pump GPM Capacity/2*24=Gallons of water pumped per day; if Gallons of water pumped per day>(Gallons in pool*turnover), then (Gallons in pool*turnover)/(GPM/2*60)=Hours on Low Speed, else ((Gallons in Pool*turnover)–Gallons of water pumped per day)/GPM=Hours on High Speed; Run Time per Day=Hours on Low Speed+Hours on High Speed.

The system 64 may then calculate the following selectable (using, e.g., the smartphone or a dial on the input mechanism 66) example speed settings:
Speed Setting 1: BASE GPM-10 GPM for 31 minutes of every hour and BASE GPM+11 GPM for 29 minutes of every hour;
Speed Setting 2: BASE GPM=GAL/((60*HOURS)/(TURNS*1.1)), for TURNS=1.1;
Speed Setting 3: BASE GPM=GAL/((60*HOURS)/(TURNS*1.2)), for TURNS=1.2;
Speed Setting 4: BASE GPM=GAL/((60*HOURS)/(TURNS*1.3)), for TURNS=1.3;
Speed Setting 5: BASE GPM=GAL/((60*HOURS)/(TURNS*1.4)), for TURNS=1.4; and
Speed Setting 6: BASE GPM=GAL/((60*HOURS)/(TURNS*1.5)), for TURNS=1.5.

An actual use example of the foregoing implementation may be as follows. Given GAL=20,000; GPM=85; TURNS=2; HOURS=17; BASE GPM=39; Speed 1=29; and Speed 2=50; the system 64 may calculate the following selectable speed settings:
Speed Setting 1: 31 minutes every hour of operation at 29 GPM or 29/85 Percent Flow=34.11%=1,177 RPM, and 29 minutes every hour of operation at 50 GPM or 50/85 Percent Flow=58.82?/=2,029 RPM, with Gallons Pumped=40,153;
Speed Setting 2: BASE GPM=43.14, Speed 1=33.14%, RPM=1,345, and Speed 2=54.14%, RPM=2,197, and Gallons Pumped=44,153;
Speed Setting 3: BASE GPM=47.06, Speed 1=37.06%, RPM=1,504, and Speed 2=58.06%, RPM=2,357, with Gallons Pumped=48,153;
Speed Setting 4: BASE GPM=50.98, Speed 1=40.98%, RPM=1,663, and Speed 2=61.98%, RPM=2,516, with Gallons Pumped=52,153;
Speed Setting 5: BASE GPM=54.90, Speed 1=44.90%, RPM=1,822, and Speed 2=65.90%, RPM=2,675, with Gallons Pumped=56,153; and
Speed Setting 6: BASE GPM=58.82, Speed 1=48.82%, RPM=1,982, Speed 2=69.82, RPM=2,834, with Gallons Pumped=60,153.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A dual motor system with flow control, the dual motor system comprising:
a first motor of a first type including a first stator and a first rotor providing a lower speed range under a first type of control;
a second motor of a second type including a second stator and a second rotor providing a higher speed range under a second type of control;
a common shaft, wherein the first and second motors are coaxially arranged and aligned on a common axis defined by the common shaft and configured to drive the common shaft;
a pump coupled with and driven by the common shaft and configured to pump a volume of a fluid; and
a motor control system including a flow control system configured to control the first motor and engage the second motor as needed to control a speed of the common shaft and pumping of the volume of the fluid by the pump, the flow control system providing at least four speeds, wherein—
a lowest speed is not more than one-half of a highest speed,
the dual motor system runs at a two higher speeds for no more than twelve hours in a twenty-four hour period, and
the dual motor system does not run continuously at the highest speed for more than two hours in the twenty-four hour period.

2. The dual motor system of claim 1, wherein the at least four speeds include—
a first speed which is between thirty and forty percent of the highest speed;
a second speed which is between forty-five and fifty-five percent of the highest speed;
a third speed which is between seventy-five and eighty-five percent of the highest speed; and
a fourth speed which is the highest speed.

3. The dual motor system of claim 2, wherein the pump moves a maximum volume of the fluid through a filter in the twenty-four hour period by using the second speed continuously for twelve hours and the fourth speed continuously for twelve hours.

4. The dual motor system of claim 2, wherein the pump moves a minimum volume of the fluid through a filter in the twenty-four hour period by using the first speed continuously for twenty-four hours.

5. The dual motor system of claim 1, wherein the flow control system includes at least three cycles, including—
an energy saving cycle in which twice the volume of the fluid is moved by the pump through a filter in a twenty-four hour period;
a maximum filtering cycle in which the volume of the fluid is moved through the filter at a maximum filtering capacity of the filter; and
an intermediate cycle in which an average volume of the fluid between the energy saving cycle and the maximum filtering cycle is moved through the filter using a first speed which is between thirty and forty percent of a highest speed.

6. The dual motor system of claim 1, wherein the flow control system includes a cleaning mode in which the dual motor system runs at a highest speed for no more than thirty minutes.

7. The dual motor system of claim 1, wherein a flow rate corresponding to each speed of the at least four speeds is used by the flow control system to determine a plurality of performance options to accomplish moving the volume of the fluid through a filter in the twentyfour hour period, wherein each performance option provides a different total flow amount.

8. The dual motor system of claim 7, wherein each performance option is selectable using an electronic interface and the flow control system uses a real-time clock to engage a selected performance option at an indicated time.

9. The dual motor system of claim 7, wherein each performance option is selectable by sending a wireless signal via an electronic communications medium to the flow control system.

10. The dual motor system of claim 7, wherein each performance option is selectable by manually adjusting an analog potentiometer coupled with the flow control system.

11. The dual motor system of claim 7, wherein each performance option is selectable using a binary coded potentiometer coupled with the flow control system.

12. A dual motor system with flow control, the dual motor system comprising:
a first motor which is a variable speed synchronous motor providing a lower speed range with a variable speed drive, the first motor having a first rotor;
a second motor which is an asynchronous induction motor providing a higher speed range with a non-variable speed drive, the second motor having a second rotor;
a common shaft, wherein the first and second motors are coaxially arranged and aligned on a common axis defined by the common shaft and configured to drive the common shaft, with the first and second rotors being fixed to the common shaft;
a pump coupled with and driven by the common shaft and configured to pump a volume of a fluid; and
a motor control system including a flow control system configured to control the first motor and engage the second motor as needed to control a speed of the common shaft and pumping of the volume of the fluid by the pump, with the flow control system providing at least four speeds, wherein—
a lowest speed is not more than one-half of a highest speed;
the dual motor system runs at a two higher speeds for no more than twelve hours in a twenty-four hour period; and
the dual motor system does not run continuously at the higher speed for more than two hours in the twenty-four hour period.

13. The dual motor system of claim 12, wherein the at least four speeds include—
a first speed which is between thirty and forty percent of the highest speed;
a second speed which is between forty-five and fifty-five percent of the highest speed;
a third speed which is between seventy-five and eighty-five percent of the highest speed; and
a fourth speed which is the highest speed.

14. The dual motor system of claim 12, wherein the flow control system includes at least three cycles, including—
an energy saving cycle in which twice the volume of the fluid is moved by the pump through a filter in the twenty-four hour period;
a maximum filtering cycle in which the volume of the fluid is moved through the filter at a maximum filtering capacity of the filter; and
an intermediate cycle in which an average volume of the fluid between the energy saving cycle and the maximum filtering cycle is moved through the filter using the lowest speed.

15. The dual motor system of claim 12, wherein the flow control system includes a cleaning mode in which the dual motor system runs at the highest speed for no more than thirty minutes.

16. The dual motor system of claim 12, wherein the a flow rate corresponding to each speed of the at least four speeds is used by the flow control system to determine a plurality of selectable performance options to accomplish moving the volume of the fluid through a filter in the twenty-four hour period, wherein each selectable performance option provides a different total flow amount.

17. A dual motor system with flow control, the dual motor system comprising:
a first motor which is a variable speed synchronous motor providing a lower speed range of up to between two thousand eight hundred and three thousand revolutions per minute with a variable speed drive, the first motor having a first rotor;
a second motor which is an asynchronous induction motor providing a higher speed range defined by at least two higher speeds over three thousand revolutions per minute with a non-variable speed drive, the second motor having a second rotor;
a common shaft, wherein the first and second motors are coaxially arranged and aligned on a common axis defined by the common shaft and configured to drive the common shaft, with the first and second rotors being fixed to the common shaft;
a pump coupled with and driven by the common shaft and configured to pump a volume of a fluid; and
a motor control system including a flow control system configured to control the first motor and engage the second motor as needed to control a speed of the common shaft and pumping of the volume of the fluid by the pump, with the flow control system providing at least four speeds,
wherein—
a first speed is between thirty and forty percent of a highest speed,
a second speed is between forty-five and fifty-five percent of the highest speed,
a third speed is between seventy-five and eighty-five percent of the highest speed, and
a fourth speed which is the highest speed, the dual motor system runs at the third or fourth speeds for no more than twelve hours in a twenty-four hour period; and the dual motor system does not run continuously at the fourth speed for more than two hours in the twenty-four hour period, and wherein a flow rate corresponding to each speed of the at least four speeds is used by the flow control system to determine a plurality of selectable performance options to accomplish moving by the pump a volume of the fluid through a filter in the twenty-four hour period, wherein each selectable performance option provides a different total flow amount.

18. The dual motor system of claim 17, wherein the flow control system includes at least three cycles, including— an energy saving cycle in which twice the volume of the fluid is moved by the pump through the filter in the twenty-four hour period;

a maximum filtering cycle in which the volume of the fluid is moved through the filter at a maximum filtering capacity of the filter; and an intermediate cycle in which an average volume of the fluid between the energy saving cycle and the maximum filtering cycle is moved through the filter using the first speed.

19. The dual motor system of claim 17, wherein the flow control system includes a cleaning mode in which the dual motor system runs at the highest speed for no more than thirty minutes.

\* \* \* \* \*